(12) United States Patent
Hu

(10) Patent No.: US 12,447,925 B2
(45) Date of Patent: Oct. 21, 2025

(54) TIRE FASTENING DEVICE

(71) Applicant: QINGDAO NEWBIT INDUSTRIAL CO., LTD, Shandong (CN)

(72) Inventor: Lijun Hu, Shandong (CN)

(73) Assignee: QINGDAO NEWBIT INDUSTRIAL CO., LTD, Shandong (CN)

( * ) Notice: Subject to any disclaimer, the term of this patent is extended or adjusted under 35 U.S.C. 154(b) by 471 days.

(21) Appl. No.: 17/958,385

(22) Filed: Oct. 1, 2022

(65) Prior Publication Data

US 2023/0029104 A1    Jan. 26, 2023

(30) Foreign Application Priority Data

Aug. 18, 2022    (CN) .......................... 202210993718.X

(51) Int. Cl.
   B60T 3/00     (2006.01)
   B60P 3/077    (2006.01)
   B60R 25/09    (2013.01)

(52) U.S. Cl.
   CPC .............. B60R 25/09 (2013.01); B60P 3/077 (2013.01); B60T 3/00 (2013.01)

(58) Field of Classification Search
   CPC . B60T 3/00; B60P 3/077; B60R 25/09; B61H 7/10
   USPC .......................... 188/4 R, 5, 32; 410/9, 10, 30
   See application file for complete search history.

(56) References Cited

U.S. PATENT DOCUMENTS

| 2,773,564 | A | * | 12/1956 | Helen | B60T 3/00 188/32 |
|---|---|---|---|---|---|
| 4,934,489 | A | * | 6/1990 | Jackson | B60T 3/00 188/74 |
| 5,381,680 | A | * | 1/1995 | Rauch, Jr. | B60T 1/04 188/74 |
| 6,425,465 | B1 | * | 7/2002 | Tallman | B60P 3/075 188/32 |
| 2004/0108172 | A1 | * | 6/2004 | Fox | B60T 3/00 188/32 |
| 2007/0050999 | A1 | * | 3/2007 | Milner | B65G 69/2882 33/286 |
| 2022/0306054 | A1 | * | 9/2022 | Bao | B60T 3/00 |
| 2023/0029104 | A1 | * | 1/2023 | Hu | B60T 3/00 |

* cited by examiner

*Primary Examiner* — Thomas J Williams
(74) *Attorney, Agent, or Firm* — HOUTTEMAN LAW LLC

(57) ABSTRACT

The present utility model discloses a tire fastening device, comprising a support seat, wherein an end portion of the support seat is slidably connected to a moving rod, a collar is sleeved and mounted on an outer surface of the moving rod, a fastening plate is welded and fixed on both a lower surface of the collar and a side surface of the support seat, a fixing plate is welded and fixed at one end inside the support seat, a screw rod is rotatably connected to a bearing via the fixing plate inside the support seat, and a second torsion gear is welded and fixed at one side of the fixing plate at an end portion of the screw rod; by designing the screw rod inside the support seat, and designing the first connecting plate and the moving head at the end of the moving rod, it is possible to move the moving head on the outer surface of the screw rod when the support seat and the fastening plate are closed on one side of the tire when the screw rod situ, and the moving rod is moved on the end of the support seat by the first connecting plate when the moving head moves.

5 Claims, 4 Drawing Sheets

TIRE FASTENING DEVICE

CROSS-REFERENCE TO RELATED PATENT APPLICATION

This application claims the benefit of priority to China Patent Application No. 202210993718.X, filed on Aug. 18, 2022. The entire content of the above identified application is incorporated herein by reference.

FIELD

The utility model falls within the technical field of tire fastening devices, and specifically relates to tire fastening devices.

BACKGROUND

When the caravan stops, placing the caravan directly contacting the ground via the wheels, and when the caravan wheels are placed contacting the ground, reinforcing the caravan tires via the tire fastening device; when the tire fastening device is used, facilitating the direct release from the ground for stable placement, facilitating the micro-adjustment for use when placed, facilitating the fastening of the tires, and improving the fastening of the tires, thereby stably placing the caravan;

When the caravan is stationary, the existing tire fastening device directly closes on one side of the caravan tire via the support seat so that the fastening plate is pressed against the tire surface, and slides the collar on the outer surface of the moving rod again, so that the collar slidably adjusts the other fastening plate to be pressed against the tire surface, thereby positioning the tire when the tire is stationary, and at this time, the collar is not convenient for fine adjustment when the outer surface of the moving rod is in hand-held sliding, and when the collar is fixed, it needs to be fixed by inserting a bolt into the inner part of the clamping hole, resulting in that the collar needs to match with the clamping hole to be fixed, thus resulting in the problem that the clamping plate is not convenient for fastening the tire after fixing the collar. To this end we propose a tire fastening device.

SUMMARY OF THE INVENTION

The purpose of the utility model is to provide a tire fastening device, so as to solve the above-mentioned problems in the background art that it is inconvenient to perform fine adjustment when the collar is in hand-held sliding on the outer surface of the moving rod, and when the collar is fixed, it is necessary to insert a bolt into the inside of the clamping hole, resulting in that the collar needs to match with the clamping hole to be fixed, thus resulting in that the clamping plate is inconvenient to fasten the tyre after fixing the collar.

In order to achieve the above-mentioned object, the present utility model provides the following technical solutions: A tire fastening device, comprising a support seat, wherein an end portion of the support seat is slidably connected with a moving rod; after a collar is fixedly mounted on an outer surface of the moving rod, it is convenient to adjust the position of the collar and a clamping plate by moving the moving rod; the collar is sleeved and mounted on the outer surface of the moving rod; a clamping plate is welded and fixed on both a lower surface of the collar and a side surface of the support seat; when the support seat and the collar are in contact with the ground, the clamping plate is directly adjusted to press against the surface of the tire so as to facilitate the installation and use of the clamping plate; the inner surface of the clamping plate is in an arc-shaped structure; and the two clamping plates are symmetrically arranged; facilitating the strengthening of the fastening of the tire by two clamping plates; a fixing plate is welded and fixed at one end of the inside of the support seat; the inside of the support seat is rotatably connected to a bearing via the fixing plate; a screw rod is welded and fixed at one side of the fixing plate at an end part of the screw rod; a connecting rod is rotatably connected to one end of the upper surface of the support seat via the bearing; a crank handle is sleeved and mounted at an end part of the connecting rod; a first torsion gear is welded and fixed at the inside of the support seat at an end part of the crank handle; and the first torsion gear and the second torsion gear are connected in meshing engagement with each other. Two first connection plates are welded and fixed at an end portion of the moving rod inside the support seat, a moving head is welded and fixed at the end portions of the two first connection plates, and the screw rod passes through the inside of the moving head; the connecting rod and the first torsion gear are driven to rotate by a hand-held swing handle, and the second torsion gear and the screw rod are driven to rotate in situ when the first torsion gear rotates, so that when the moving head moves, the moving rod is finely adjusted by means of the first connection plates for use in movement adjustment; and when the moving rod moves to adjust the position of the collar and the fastening plate, it is convenient to press the fastening plate on the other side of the tire. And placing the support seat and the collar in contact with the ground, so as to facilitate fine adjustment of the collar and the fastening plate, facilitating adjustment and use when fastening the tire of the caravan, facilitating adjustment and pressing and mounting the tire of the caravan, thereby fixing the tire on the ground, facilitating more stable placement of the caravan.

Preferably, a second sliding rod is slidably connected to a side surface of said support seat, and an end portion of said second sliding rod is fixedly connected to an end portion of said support seat via a fixing knob; a sliding body is slidably connected to a side surface of said collar, and said sliding body is fixedly connected to said collar via a fixing knob; a sliding head is welded and fixed to an end portion of said sliding body, so as to facilitate sliding the second sliding rod inside the sliding head; and after the tire is fixedly mounted via the clamping plate, the second sliding rod and the sliding body are easily slid in the middle, and the end portion of the second sliding rod passes through the inside of the sliding head for sliding. Sliding the second sliding rod inside the sliding head to a certain position, fixing the second sliding rod and the sliding body by means of a fixing knob, so that the supporting seat and the side face of the collar are reinforced and supported, and the sliding body is easy to be placed stably for use; said second sliding rod and the side face of said sliding head are both in a rectangular structure, and the outer surface of said second sliding rod matches the inside of said sliding head, and the end portion of said second sliding rod penetrates through the inside of said sliding head, so that when the clamping plate is pressed against the side face of the tire during fine adjustment use, the supporting seat and the collar are reinforced, and deformation and damage of the supporting seat and the collar are not easily caused; improve the effect of stable support.

Preferably, the outer surface of the second sliding rod slides with the interior of the sliding head, and the side surface of the support seat and the sliding body are slidably connected to the sliding head via the second sliding rod, so that the support seat and the end of the collar are reinforced by the second sliding rod sliding on the interior of the sliding head, and the support seat and the end of the collar are not easily deformed and damaged.

Preferably, the lead screw is screw-coupled with the inside of the moving head by a screw structure, and the lead screw and the moving head are coupled with the lead screw by the first connection plate, so that the moving head can be adjusted by the lead screw rotation at the time of adjustment, thereby being easily adjusted for use at the time of installation.

Preferably, an end portion of the moving bar is extended to an end portion of the supporting seat, and the collar is fixedly coupled to an outer surface of the moving bar by a bolt, so that the collar is fixedly installed, and the collar and the fastening plate are easily fixedly installed.

Compared with the prior art, the beneficial effects of the utility model are:

By designing the screw rod inside the support seat, and designing the first connecting plate and the moving head at the end of the moving rod, when the support seat and the fastening plate are closed on one side of the tire, the moving head can move on the outer surface of the screw rod when the screw rod rotates in situ, and the first connecting plate drives the moving rod to move on the end of the support seat when the moving head moves, and when the moving rod moves, the position of the collar and the fastening plate can be adjusted, so that the fastening plate can be pressed against the other side of the tire, so that the collar and the fastening plate can be finely adjusted when fastening, and when fastening the tire of the caravan, it is easy to adjust and use, and the adjustment is more convenient. Mounting the tire of the caravan by pressing so as to fix the tire on the ground, facilitating more stable placement of the caravan, solving the problem of not facilitating fine adjustment when the lantern ring slides, and causing the lantern ring to be fixed only by matching with the clamping hole when fixing the lantern ring, thus causing the problem of not facilitating fastening of the tire by the clamping plate after fixing the lantern ring.

In the figure: 1, A first torsional gear; 2, A second torsional gear; 3, A fixed plate; 4, moving the head; 5, screw rod; 6, A support base; 7, A crank; 8, A fastening plate; 9, A first connection plate; 10, moving the rod; 11, A sliding body; 12, A collar; 13, A second slide bar; 14, sliding head; 15, connecting rod.

DETAILED DESCRIPTION

The technical solutions of the embodiments of the present invention will be described clearly and completely below with reference to the accompanying drawings of the embodiments of the present invention. It is obvious that the described embodiments are only a part of the embodiments of the present invention, rather than all the embodiments. Based on the embodiments of the present utility model, all the other embodiments obtained by a person of ordinary skill in the art without making any inventive effort fall within the scope of protection of the present utility model.

Figure 1:
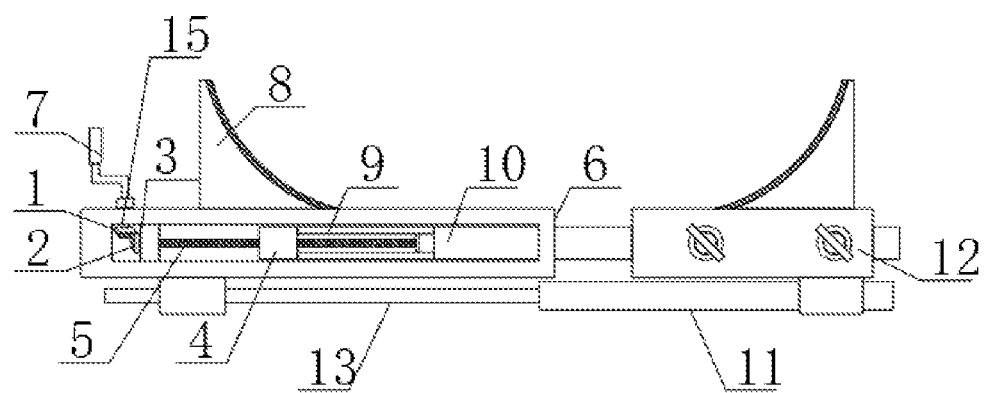
FIG. 1 is a schematic structural diagram of the present utility model.
Figure 2:
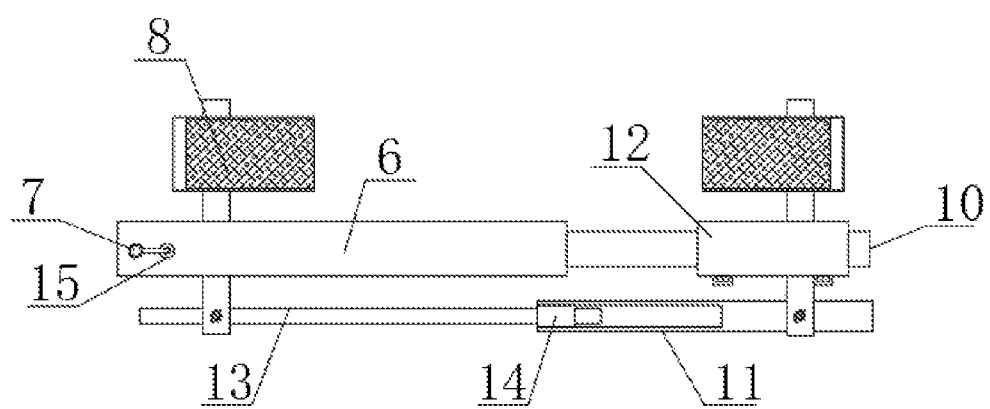
FIG. 2 is a schematic diagram of a top view structure of the present utility model.
Figure 3:
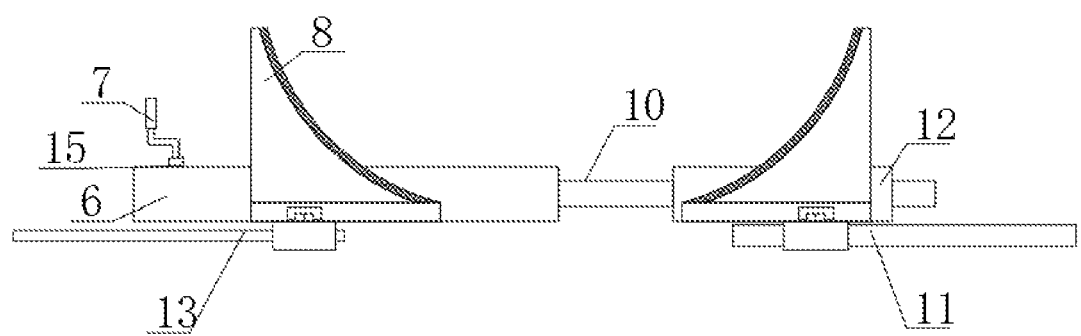
FIG. 3 is a schematic diagram of a side structure of the present utility model.
Figure 4:
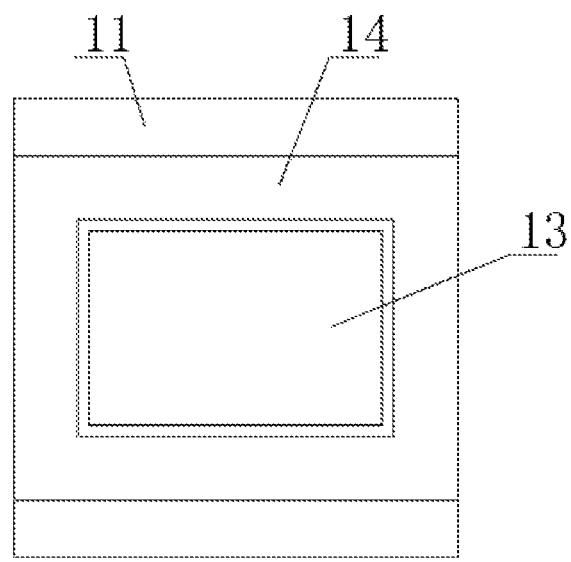
FIG. 4 is a schematic diagram of a side structure of a sliding body, a second sliding rod and a sliding head of the present utility model.

With reference to FIGS. 1 to 4, the present utility model provides a technical solution: A tire fastening device comprising a support seat 6, wherein a moving rod 10 is slidably connected to an end portion of the support seat 6, so that in use, it is easy to adjust and use by sliding the moving rod 10 inside the support seat 6, a collar 12 is sheathed and mounted on an outer surface of the moving rod 10, so that the collar 12 is fixed and mounted inside the moving rod 10, so that the collar 12 is fixed and mounted so as to fix a fastening plate 8, and a fastening plate 8 is fixed and welded on both a lower surface of the collar 12 and a side surface of the support seat 6, so that in fastening a tire, the fastening plate 8 can be stably placed in contact with the ground via the support seat 6 and the collar 12 when the support seat 6 is fastened; thereby pressing two fastening plates 8 on the side surface of the tire, facilitating the fastening of the tire, and facilitating the stable placement and use of the caravan; one end of the inside of the support seat 6 is welded and fixed with a fixing plate 3; the inside of the support seat 6 is rotatably connected with the bearing via said fixing plate 3; the end part of the screw rod 5 is welded and fixed at one side of the fixing plate 3 with a second torsion gear 2; one end of the upper surface of the support seat 6 is rotatably connected with a connecting rod 15 via the bearing; the end part of the connecting rod 15 is sheathed and mounted with a crank 7; the end part of the crank 7 is welded and fixed inside the support seat 6 with a first torsion gear 1; and the first torsion gear 1 and the second torsion gear 2 are connected in a snap-fit manner, so that when in use, the connecting rod 15 and the first torsion gear 1 are driven to rotate by the hand-held crank 7, and the second torsion gear 2 and the lead screw 5 are driven to rotate in situ when the first torsion gear 1 rotates, and it is easy to drive the first connecting plate 9 and the moving head 4 to move on the outer surface of the lead screw 5 via the rotation of the lead screw 5, so as to facilitate adjustment and use; and the end part of the moving rod 10 is located inside the support seat 6 and is welded and fixed with two first connecting plates 9, and the end parts of the two first connecting plates 9 are welded and fixed with the moving head 4. In addition, the lead screw 5 extends through the interior of the moving head 4, so that when the moving head 4 moves, a first connecting plate 9 is used to perform movement adjustment and adjustment on the fine adjustment of the moving rod 10; when the moving rod 10 moves and adjusts the position of the collar 12 and the fastening plate 8, the fastening plate 8 is easily pressed against the other side of the tyre; and when the support seat 6 is placed in contact with the collar 12 on the ground, the collar 12 and the fastening plate 8 are easily to perform fine adjustment; when the caravan tyre is fastened, the adjustment is easy to use, the adjustment is more convenient, and the caravan tyre is pressed and installed, so that the tyre is fixed on the ground, so that the caravan is more stably placed.

In the present embodiment, it is preferable that a second sliding rod 13 is slidably connected to a side surface of the support seat 6, and an end portion of the second sliding rod 13 is fixedly connected to an end portion of the support seat 6 via a fixing knob; a sliding body 11 is slidably connected to a side surface of the collar 12, and the sliding body 11 is fixedly connected to the collar 12 via a fixing knob; a sliding head 14 is welded and fixed to an end portion of the sliding body 11, and an end portion of the second sliding rod 13 passes through the inside of the sliding head 14; and when the fine-tuning moving rod 10, the collar 12 and the fastening plate 8 are fastened to the tire, sliding the second sliding rod 13 and the sliding body 11 in the middle, and sliding the end of the second sliding rod 13 through the interior of the sliding head 14, sliding the second sliding rod 13 in the interior of the sliding head 14 to a certain position, fixing the second sliding rod 13 and the sliding body 11 via a fixing knob, so that the support of the end of the support seat 6 and the collar 12 is strengthened via the second sliding rod 13, the sliding head 14 and the sliding body 11, so that when the support seat 6 and the side of the collar 12 are supported and placed, the tire is fastened via the fastening plate 8, and it is not easy to cause the support seat 6 and the collar 12 to be subjected to a heavy load to deformation and damage, so as to and use; improve the use effect.

In order to facilitate the stable control and use of the sliding of the second sliding rod 13 inside the sliding head 14, the side surfaces of the second sliding rod 13 and the sliding head 14 are both in a rectangular structure, and the outer surface of the second sliding rod 13 matches the inside of the sliding head 14; in order to facilitate the sliding of the second sliding rod 13 inside the sliding head 14 after the sliding body 11 is moved by the adjusting and moving rod 10 and the collar 12, the supporting seat 6 and the side surface of the collar 12 are strengthened and supported after the tire is fixedly mounted, and the outer surface of the second sliding rod 13 slides with the inside of the sliding head 14; and the side surface of the support seat 6 is slidably connected to the sliding body 11 via the second sliding rod 13 and the sliding head 14; in order to facilitate the rotation of the fine adjustment moving head 4 via the screw rod 5, the first connecting plate 9 is used with the moving rod 10 to facilitate the adjustment operation; the screw rod 5 is connected to the inside of the moving head 4 via a threaded structure, and the screw rod 5 and the moving rod 10 are connected to the screw rod 5 via the first connecting plate 9; after the collar 12 is fixedly mounted, the fastening plate 8 is fixed via the collar 12, and the end portion of the moving rod 10 extends to the end portion of the support seat 6; and the collar 12 is fixedly connected to the outer surface of the moving rod 10 via a bolt, and in order to facilitate the fastening of the caravan tyre via the two fastening plates 8 and facilitate the reinforced placement of the caravan, the inner surface of the fastening plate 8 is of an arc-shaped structure, and the two fastening plates 8 are symmetrically arranged.

The working principle and use process of the utility model: in this tire fastening device, before use, when the caravan is first placed on a certain ground, in which case the caravan tire contacts the ground, the sliding body 11 slides to one end of the collar 12, the second sliding rod 13 slides to one end of the support seat 6, the support seat 6 is closed on one side of the tire, in which case the fastening plate 8 is closed on one side of the caravan tire by means of the support seat 6, at the same time, the collar 12 is sleeved on the end of the moving rod 10 and is fixedly mounted by means of a bolt, so as to fix the other fastening plate 8, and when the collar 12 is closed, the end of the second sliding rod 13 penetrates the inside of the sliding head 14. After the collar 12 is fixedly mounted, at this moment, the hand-held crank 7 drives the connecting rod 15 and the first torsional gear 1 to rotate, and drives the second torsional gear 2 and the lead screw 5 to rotate in situ when the first torsional gear 1 rotates; when the lead screw 5 rotates in situ, the moving head 4 moves on the outer surface of the lead screw 5; when the moving head 4 moves, the first connecting plate 9 drives the moving rod 10 to move on the end of the support seat 6; and when the moving rod 10 moves, the positions of the collar 12 and the fastening plate 8 are adjusted so as to press the fastening plate 8 on the other side of the tyre, and place same in contact with the collar 12 on the ground via the support seat 6. It is convenient to perform fine adjustment on the collar 12 and the fastening plate 8, it is convenient to adjust and use when fastening the tire of the motor home, and it is more convenient to adjust and install the tire of the motor home by pressing, so as to fix the tire on the ground, and it is convenient to place the motor home more stably;

Then when fine-tuning the moving rod 10, the collar 12 and the fastening plate 8, and moving the two 8 to fasten the tire for use, at this time, sliding the second sliding rod 13 and the sliding body 11 towards the middle and sliding the end of the second sliding rod 13 through the inside of the sliding head 14, sliding the second sliding rod 13 inside the sliding head 14 to a certain position, and fixing the second sliding rod 13 and the sliding body 11 by means of a fixing knob, so as to facilitate the second sliding rod 13, the sliding head 14 and the sliding body 11 to strengthen the support for the side face of the support seat 6 and the side face of the collar 12; when the side of the support seat 6 and the side of the collar 12 are supported and placed, the tire is fastened by the fastening plate 8, so that the side of the support seat 6 and the side of the collar 12 are less likely to be subjected to heavy compression and deformation damage, enhancing protection and use, and improving use effects.

While the embodiments of the present invention have been shown and described, it will be understood by those skilled in the art that various changes, modifications, substitutions and alterations may be made thereto without departing from the principles and spirit of the invention, the scope of which is defined by the appended claims and their equivalents.

What is claimed is:
1. A tire fastening device, comprising:
a support seat (6) having an interior space, and having a first end portion and a second end portion opposite to the first end portion;
a moving rod (10), which is slidably connected to the second end portion of the support seat (6) and is capable of slidably moving in the interior space of the support seat (6), wherein the moving rod (10) has a first end portion and a second end portion opposite to the first end portion;
a collar (12), which is sleeved and fixedly mounted on an outer surface of the second end portion of the moving rod (10);
two fastening plates (8), which are welded and fixed to a lower surface of the collar (12) and a side surface of the support seat (6), respectively;
a fixed plate (3), which is welded and fixed at one end of the interior space in the first end portion of the support seat (6);
a connecting rod (15), which is rotatably connected to an upper surface of the first end portion of the support seat (6);
a crank handle (7), which is sleeved and mounted at an end part of the connecting rod (15);
a first torsion gear (1), which is welded and fixed at an end portion of the crank handle (7) in the interior space of the support seat (6);
a second torsion gear (2), which is arranged on the fixed plate (3), and the first torsion gear (1) and the second torsion gear (2) are connected in meshing engagement with each other;

a screw rod (5) having a first end and a second end opposite to the first end, wherein the first end of the screw rod (5) is welded to the second torsion gear (2), and the second end of the screw rod (5) is connected to the first end portion of the moving rod (10);

two first connection plates (9), which are welded and fixed at the first end portion of the moving rod (10) in the interior space of the support seat (6); and a moving head (4) is welded and fixed at end portions of the two first connection plates (9), and the screw rod (5) passes through an inside of the moving head (4).

2. The tire fastening apparatus as claimed in claim 1, further comprising:

a second sliding rod (13) fixedly connected to the side surface of the support seat (6);

a sliding body (11) fixedly connected to a side surface of the collar (12); and a sliding head (14) is fixedly welded to an end portion of the sliding body (11), and an end portion of the second sliding rod (13) penetrates an inside of the sliding head (14) and thus the second sliding rod (13) is capable of sliding in the sliding head (14).

3. The tire fastening apparatus as claimed in claim 2, wherein: the second sliding rod (13) and the sliding head (14) are both of a rectangular shape.

4. The tire fastening apparatus as claimed in claim 1, wherein the screw rod (5) is rotatably connected to the inside of the moving head (4) via a threaded structure, and the screw rod (5) and the moving rod (10) are connected via the two first connection plates (9).

5. The tire fastening apparatus as claimed in claim 1, wherein an inner surface of each of the two fastening plates (8) is of an arc shape, and the two fastening plates (8) are symmetrically arranged.

* * * * *